Wm. W. Harding's
Impt. in Paper Making Machinery.

100755                              Patented Mar 15 1870

Witnesses: Wm. D. Wright, Wm. Burns

Inventor: Wm. W. Harding

United States Patent Office.

WILLIAM W. HARDING, OF PHILADELPHIA, PENNSYLVANIA.

Letters Patent No. 100,755, dated March 15, 1870.

IMPROVEMENT IN PAPER-MAKING MACHINERY.

The Schedule referred to in these Letters Patent and making part of the same.

*To all whom it may concern:*

Be it known that I, WILLIAM W. HARDING, of the city of Philadelphia, in the State of Pennsylvania, have invented a new and useful Improvement in Paper-Making Machinery; and I do hereby declare the following to be a full, clear, and exact description thereof, which will enable others skilled in the art to which it appertains to make and use the same, reference being had to the accompanying drawing which forms a part of this specification, and in which—

Figure 1:
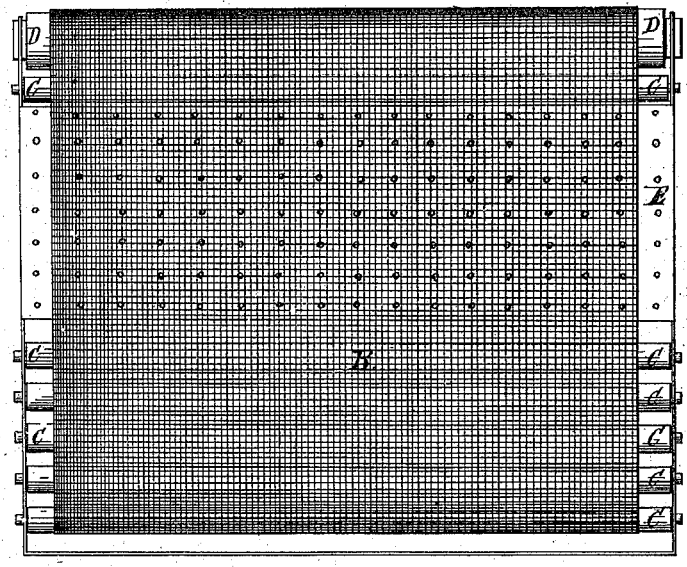

Figure 1 is a plan view, and

Figure 2:
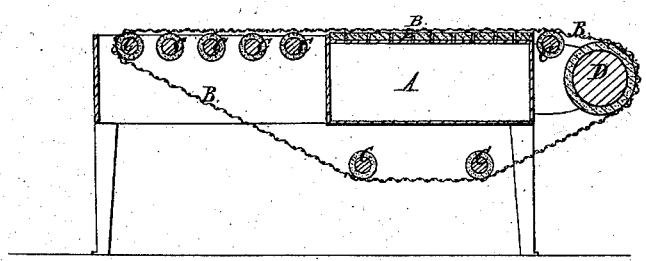

Figure 2, a longitudinal section of so much of a Fourdrinier machine as is necessary to show my improvement.

In the said drawing—

A represents the suction-box of a Fourdrinier machine.

B B, wire-cloth.

C C, the rollers on which the wire-cloth moves.

D, the couch-roll.

E, the upper plate of the suction-box.

The object of my invention is to diminish the wear of the wire-cloth, which is a heavy expense to the manufacturer. This I accomplish by covering the rollers on which the wire-cloth moves, as also the couch-roll, with soft vulcanized rubber.

I further construct the upper surface of the suction-box of a perforated plate of soft vulcanized rubber, or of strips of the same material, so that the wire-cloth is supported by soft and yielding surfaces.

What I claim as new, and desire to secure by Letters Patent of the United States, is—

1. The rollers on which the wire-cloth moves, when made of soft vulcanized rubber, or covered therewith.

2. The upper surface of the suction-box, when constructed of a perforated plate of soft vulcanized rubber, or of strips of the same material.

3. Constructing the surfaces on which the wire-cloth moves either wholly or in part of soft vulcanized rubber.

WM. W. HARDING.

Witnesses:
J. R. McFETRIDGE,
W. F. DAWSON.